United States Patent [19]

Kashichi

[11] 4,244,096
[45] Jan. 13, 1981

[54] SPEAKER BOX MANUFACTURING METHOD

[75] Inventor: Hirota Kashichi, Hachiohji, Japan

[73] Assignee: Kyowa Denki Kagaku Kabushiki Kaisha, Tokyo, Japan

[21] Appl. No.: 43,890

[22] Filed: May 30, 1979

[30] Foreign Application Priority Data

May 31, 1978 [JP] Japan ................................. 53-66237

[51] Int. Cl.³ .............................................. B23P 11/00
[52] U.S. Cl. ..................................... 29/432; 29/169.5; 29/453; 181/199; 264/249
[58] Field of Search ...................... 29/169.5, 432, 453; 179/1 E; 181/199; 264/249; 428/14, 99

[56] References Cited

U.S. PATENT DOCUMENTS

| | | | |
|---|---|---|---|
| 2,343,037 | 2/1944 | Adelman | 428/14 UX |
| 2,407,090 | 9/1946 | McMahan | 29/432 |
| 2,505,175 | 4/1950 | Davis | 29/432 UX |
| 2,705,346 | 4/1955 | Schlabach et al. | 264/249 |
| 2,840,181 | 6/1958 | Wildman | 181/199 |
| 3,019,854 | 2/1962 | O'Bryant | 29/432 UX |
| 3,484,515 | 12/1969 | Linda et al. | 264/249 X |
| 3,941,638 | 3/1976 | Horky et al. | 181/199 |
| 3,971,877 | 7/1976 | Lee | 29/453 |
| 3,980,555 | 9/1976 | Freissle | 29/453 X |
| 4,126,923 | 11/1978 | Cislak | 29/453 X |

FOREIGN PATENT DOCUMENTS

857868  12/1952  Fed. Rep. of Germany ........... 264/249

*Primary Examiner*—Charlie T. Moon
*Attorney, Agent, or Firm*—Cushman, Darby & Cushman

[57] ABSTRACT

A thermoplastic front frame having many small protrusions on the whole front face and many thorn-like sharp projections on the whole rear face. The frame is strongly forced onto a cloth with the front face of the frame being directed downwardly, so that the front protrusions cut into the cloth so as to temporarily secure the cloth to the frame. Thereafter, the peripheral portion of the cloth extending outside of the frame is folded upwardly and then further folded inwardly and pierced by the rear projections thereby being temporarily secured. Then, a heated iron is forced onto the rear projections to depress the head portions of the rear projections to cause the projection to make the head of each projection larger than the mesh of the cloth whereby the cloth is permanently secured to the frame. Then, the cloth covered frame so formed is integrally attached to the speaker box.

4 Claims, 14 Drawing Figures

SPEAKER BOX MANUFACTURING METHOD

The present invention relates to a method of manufacturing a speaker box.

In conventional methods of manufacturing a speaker box, a front frame is put on a cloth, such as grille cloth or net, with the front face of the frame being directed downwardly, and then, a peripheral portion of the cloth extending outside the frame is upwardly folded and laminated on the rear face of the frame so that the cloth is fixed on the rear face of the frame by nailing the cloth on the frame using many nails, staples or the like. However, in the course of the above procedures, the frame is very apt to slide out of position relative to the cloth with a resulting misalignment between the weave or yarn line of the cloth and the edge line of the frame. In addition, nailing of many nails or staples is troublesome and time-consuming.

Furthermore, the cloth-covered frame so formed is then fitted into a front concave of a speaker box to be secured to the speaker box by means of the friction between them. But, this is disadvantageous in that the frame often separates from the speaker box because of decrease in the securing force caused by drying of the material or other causes.

Accordingly, one object of this invention is to provide a new method of manufacturing a speaker box, in which the aforementioned defects are eliminated.

Another object of this invention is to provide a new speaker box manufacturing method which can easily cover a front frame with a cloth without misalignment of the weave of the cloth and the edge line of the frame.

Still another object of this invention is to provide a new speaker box manufacturing method which can rapidly and easily secure the frame to the speaker box.

The above objects and effects of this invention are accomplished by the speaker box manufacturing method according to this invention in which there is first prepared a thermoplastic rectangular frame having many small protrusions on the substantially whole front face and many thorn-like sharp projections on the substantially whole rear face. The frame is strongly forced onto a cloth with the front face of the frame being directed downwardly, so that the front protrusions cut into the cloth so as to temporarily secure the cloth to the frame. Thereafter, a peripheral portion of the cloth extending outside of the frame is folded upwardly and then further folded inwardly to be pierced by the rear projections to be temporarily secured. A heated iron is forced onto the rear projections to depress the head portions of the rear projections to cause the projection to have a head larger than the mesh of the cloth whereby the cloth is permanently secured to the frame. Then, the cloth-covered frame so formed is integrally attached to a speaker box by bringing engaging pieces of the rear face of the frame into engagement with engaging portions of a front face of the speaker box.

The above and other objects and effects of the present invention will become apparent from the following description of preferred embodiments of this invention with reference to the accompanying drawing, in which.

Figure 1:
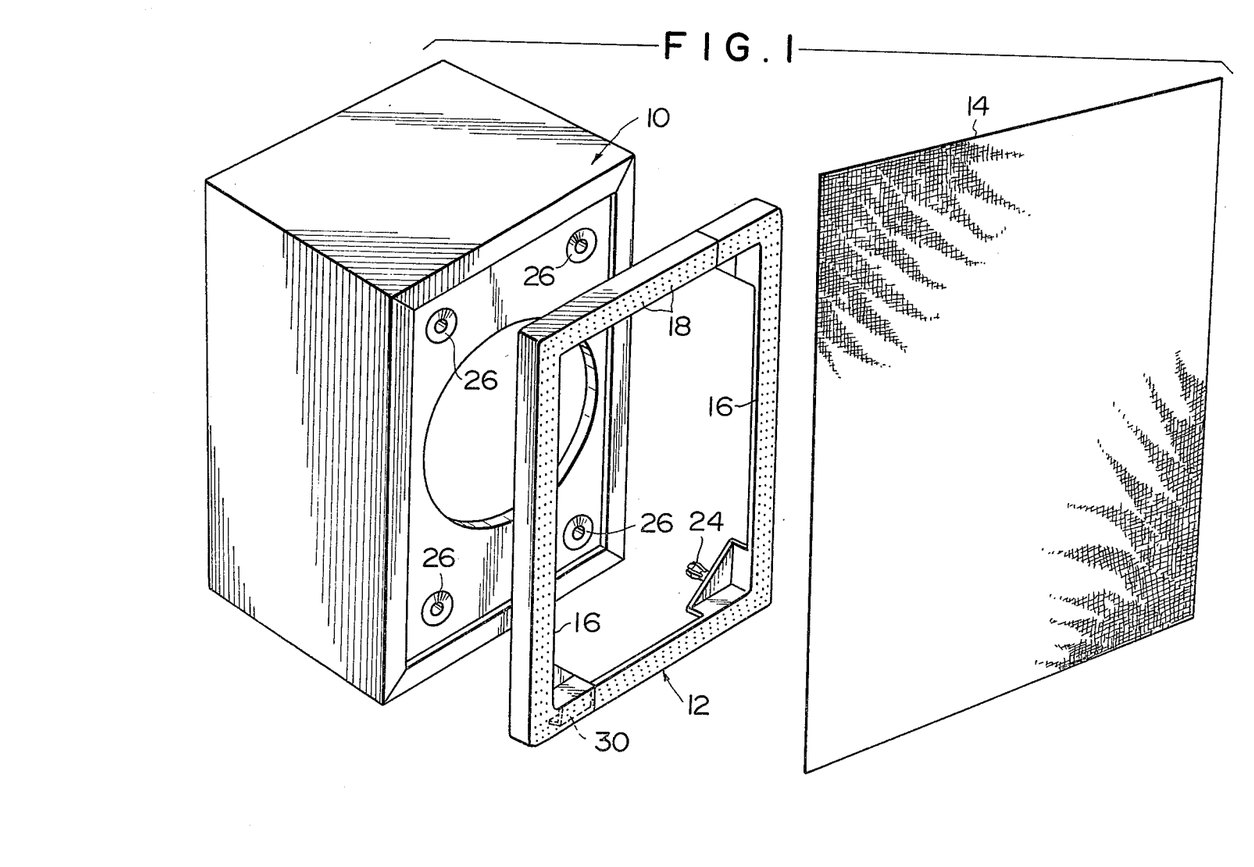
FIG. 1 is a perspective view of a speaker box, a front frame and a grille cloth before assembly for embodying a first embodiment of this invention.
Figure 2:
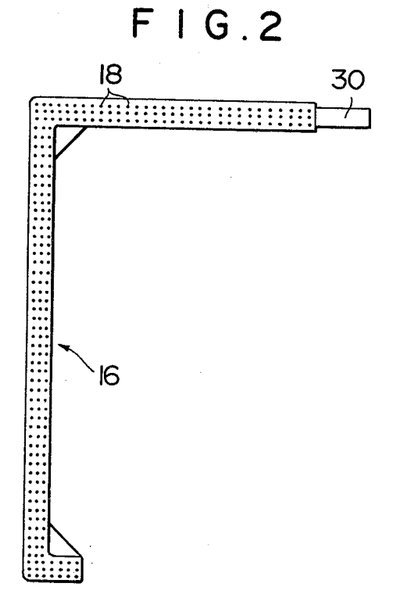
FIG. 2 is a front view of one of halves constituting the front frame in FIG. 1.
Figure 3:
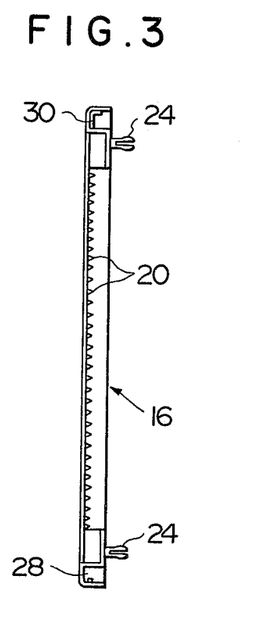
FIG. 3 is a side view of the front frame half in FIG. 2.
Figure 4:
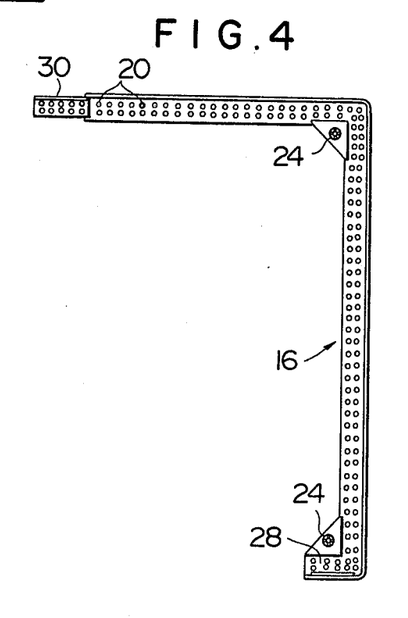
FIG. 4 is a rear view of the front frame half in FIG. 2.
Figure 5:
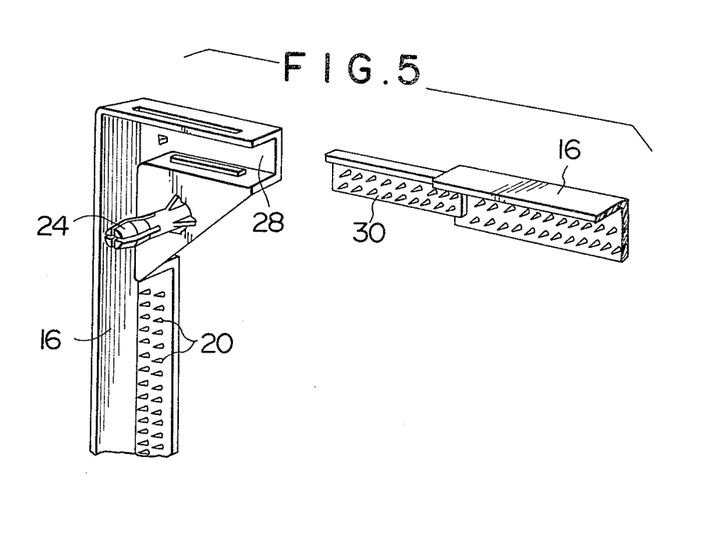
FIG. 5 is a partial view illustrating coupling portions of the front frame halves shown in FIG. 2.

Referring to FIG. 1, there are shown a speaker box 10, a front frame 12 and a cloth 14 such as a grille cloth or net, which are used in embodying the speaker box manufacturing method according to the present invention. The front frame 12 is composed of two L-shaped front frame halves 16 as shown in FIGS. 2 through 4. The frame half 16 is made of thermoplastic material and is also of L-shape in cross-section as seen from FIG. 5. The frame half 16 has many small protrusions 18 formed on the whole of a front face thereof as shown in FIG. 2. The small protrusions 18 have a length sufficient to prevent the cloth 14 put on the front face from sliding relative to the front frame but of such an extent so as not to pierce through the cloth put on the front face. The frame half 16 also has many thorn-like sharp projections 20 formed on the whole of a rear face thereof as shown in FIGS. 3 and 4. The thorn-like projections 20 are of a length sufficient to pierce through the cloth put on the rear face. The frame half 16 has a triangle plate 22 provided at each inside corner thereof, and the triangle plate 22 has a rearwardly extending engaging projections 24 adapted to be received in a retaining hole 26 formed on a front face of the speaker box 10 so as to secure the front frame to the speaker box. The frame half 16 has a channel 28 formed at one end thereof and an extension 30 formed at the other end thereof, as shown in FIG. 4. The extension 30 of each frame half is adapted to be inserted in the channel 28 of the other frame half, as shown in FIG. 5, so as to complete the front frame 12 as shown in FIG. 1.

Figure 9:
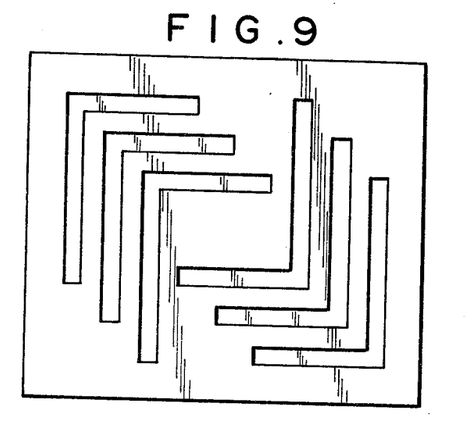
FIG. 9 is a diagrammatic plan view of a mold used for forming front-frame halves shown in FIG. 2.

The frame half 16 can be economically formed by using a mold device having, for example, six molds arranged as shown in FIG. 9, as compared with a case of using a mold for forming one complete front frame. Therefore, by constituting the front frame by the two same frame halves, the front frame can be manufactured inexpensively.

Next, the method of this invention will be described. First, two L-shaped front frame halves 16 are prepared and mutually coupled by inserting the extension 30 of each frame half into the channel 28 of the other frame half so as to form the front frame 12.

The cloth 14 is spread on a flat plate with a front surface thereof being directed downwardly. Then, the front frame 12 is strongly forced onto the cloth 14 with the front face thereof being directed downwardly, so that the many small protrusions 18 on the front face of the frame 12 cut into the cloth 14 to temporarily secure the cloth 14 to the front frame 12. As a result, the frame 12 is prevented from sliding relative to the cloth 14.

Figure 6:
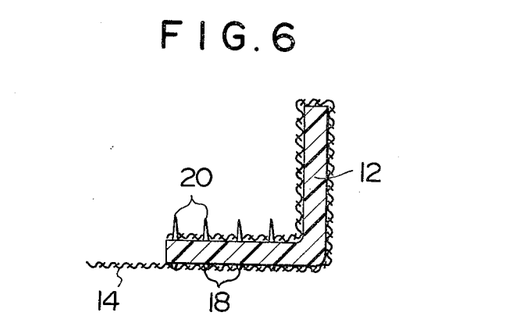
FIG. 6 is a partial sectional view illustrating a condition in which the grille cloth is temporarily secured to the front frame by thorn-like sharp projections on the rear face of the front frame.
Figure 7:
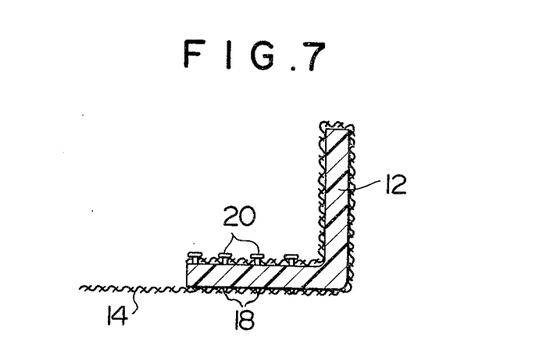
FIG. 7 is a partial sectional view illustrating a condition in which the grille cloth is permanently secured to the front frame.

Thereafter, a peripheral portion of the cloth 14 outside the front frame 12 is folded upwardly while stretching it, and then folded further downwardly and inwardly so as to be closely in contact with the rear face of the front frame and to be pierced by the many thorn-like projections 20 on the rear face, as shown in FIG. 6. As a result, the head portions of the thorn-like projections 20 extrude through the cloth 14. A heated iron (not shown) is then forced onto the thorn-like projections 20 to soften and depress the head portions of the projections 20 so as to cause the projection 20 to have a head larger than the mesh of the cloth 14, whereby the cloth 14 is permanently secured to the front frame 12, as shown in FIG. 7.

Figure 8:
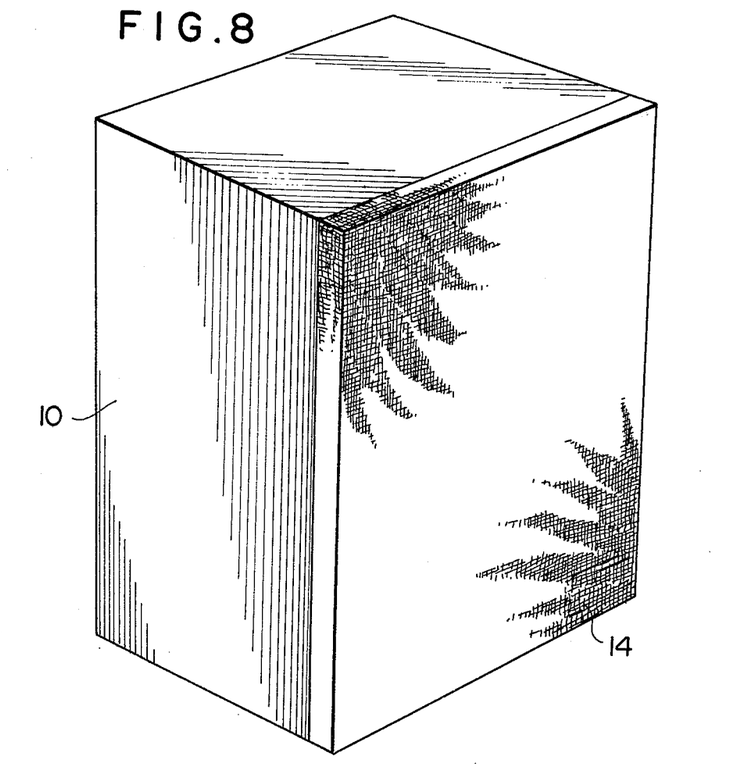
FIG. 8 is a perspective view of a speaker box manufactured according to this invention.

The cloth-covered front frame so formed is then mounted on the front face of the speaker box 10 by bringing the rear face of the frame into registration with the front face of the speaker box and inserting the engaging projections 24 of the frame into the corresponding holes 26 of the speaker box 10. Consequentially, the speaker box with the cloth-covered front panel is completed as shown in FIG. 8.

Figure 10:
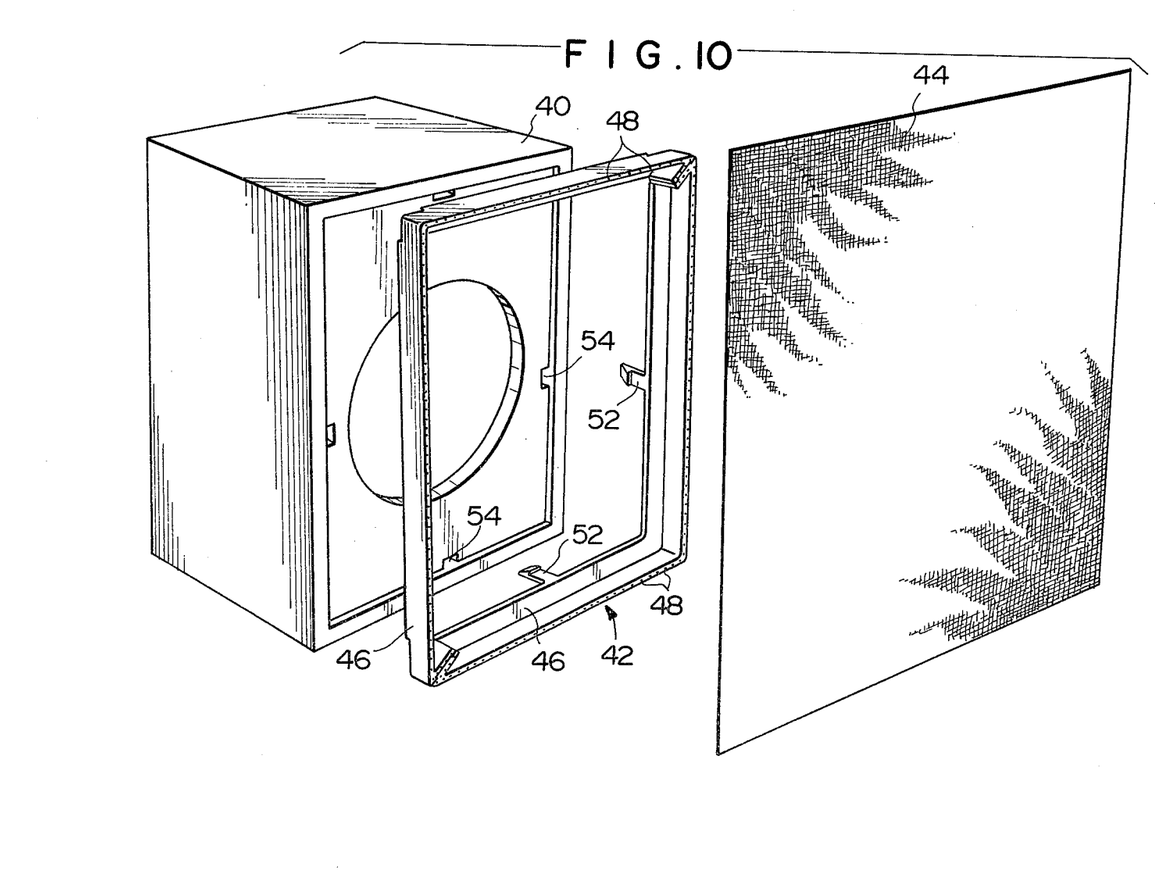
FIG. 10 is a perspective view of a speaker box, a front frame and a grille cloth before assembly for embodying a second embodiment of this invention.
Figure 11:
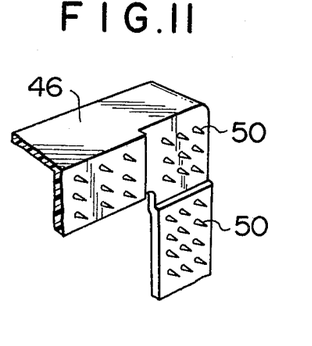
FIG. 11 is a partial perspective view of one of halves constituting the front frame shown in FIG. 10.
Figure 12:
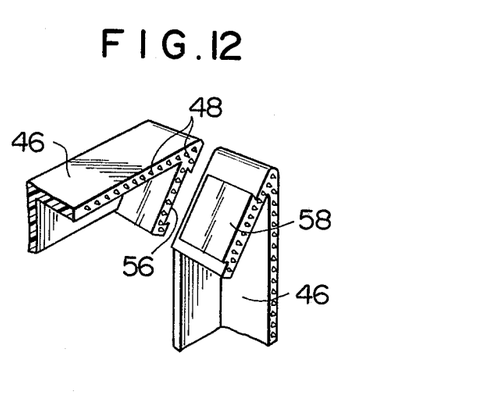
FIG. 12 is a partial perspective view illustrating the dovetail joint portions of the front frame halves shown in FIG. 10.

Next, referring to FIGS. 10 through 14, there is illustrated a second embodiment of the speaker box manufacturing method according to this invention. In FIG. 10, a speaker box 40, a front frame 42 and a grille cloth 44 before assembly are shown in spaced relation. The front frame 42 is composed of L-shaped frame halves 46 made of thermoplastic material. The frame half 46 is also L-shaped in cross-section and has many small protrusions 48 formed on the whole front end face thereof as shown in FIG. 10. The small protrusions 48 have a length sufficient to prevent the cloth 44 put on the front end face from sliding relative to the front frame but of such an extent so as not to pierce through the cloth 44 put on the front end face. The frame half 46 has many thorn-like sharp projections 50 formed on the whole rear face thereof as shown in FIG. 11. The thorn-like projections 50 are of a length sufficient to pierce through the cloth 44 put on the rear face. The frame half 46 also has at least one rearwardly extending engaging projection 52 formed on each arm thereof as shown in FIG. 10 and adapted to be received in a retaining hole 54 formed on a front face of the speaker box 40 so as to secure the front frame to the speaker box. The opposite ends of the frame half has an inclined surface of such an angle as to form a rectangular corner when the two frame halves are coupled as shown in FIG. 10. The inclined surface of one end of the frame half has a dovetail groove 56 adapted to receive a dovetail tenon 58 formed on the inclined surface of the other end of the other frame half, as best shown in FIG. 12.

Now, the method of the second embodiment will be described. First, two L-shaped front frame halves 46 are prepared and then mutually coupled by inserting the dovetail tenon 58 of each frame half 46 into the dovetail groove 56 of the other frame half, so as to complete the front frame 42.

The cloth 44 is spread on a flat plate with a front surface thereof being directed downwardly. Then, the front frame 42 is strongly forced onto the cloth 44 with the front end face thereof being directed downwardly, so that the small protrusions 48 on the front end face cut into the cloth 44 to temporarily secure the cloth 44 to the front frame 42. As a result, the frame 42 is prevented from sliding relative to the cloth 44.

Figure 13:
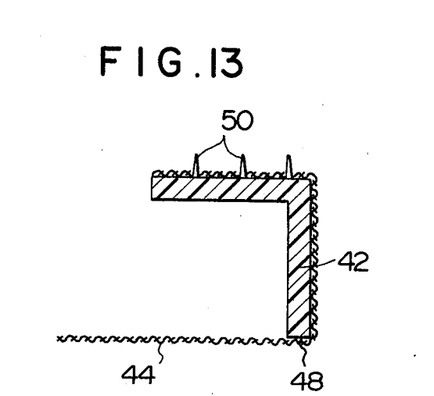
FIG. 13 is a partial sectional view illustrating a condition in which the grille cloth is temporarily secured to the front frame by thorn-like sharp projections on the rear face of the front frame.
Figure 14:
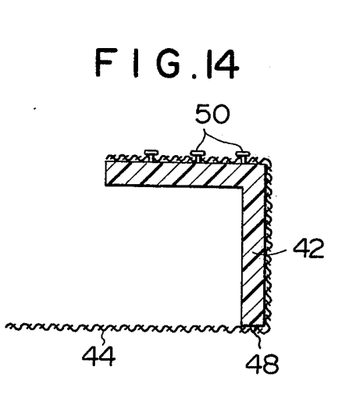
FIG. 14 is a partial sectional view illustrating a condition in which the grille cloth is permanently secured to the front frame.

Thereafter, a peripheral portion of the cloth 44 extending outside the front frame 42 is folded upwardly while stretching it, and then folded further inwardly to come closely into contact with the rear face of the front frame and to be pierced by the many thorn-like projections 50 on the rear face, as shown in FIG. 13. Consequently, the head portions of the thorn-like projections 50 extrude through the cloth 44. A heated iron (not shown) is then forced onto the thorn-like projections 50 to soften and depress the head portions of the projections 50 so as to cause each of the projections 50 to have a head larger than the mesh of the cloth 44, whereby the cloth 44 is permanently secured to the front frame 42, as shown in FIG. 14.

The cloth covered frame so formed is mounted on the front face of the speaker box 40 by bringing the rear face of the frame into registration with the front face of the speaker box and inserting the engaging projections 52 of the frame into the corresponding holes 54 of the speaker box. As a result, the speaker box having the cloth covered front panel is completed.

As seen from the above description of the embodiments of this invention, the cloth can be secured to the front frame without misalignment between the weave of the cloth and the edge line of the front frame. In addition, since the cloth can be secured to the front frame merely by forcing the heated iron to the head portions of the thorn-like thermoplastic projections extending through the cloth to soften and depress these projections so as to cause them to have enlarged heads which act to secure the cloth to the frame, the securing operation can be performed very easily and rapidly as compared with the conventional method. Furthermore, the cloth covered front frame can be easily and securely mounted on the speaker box by bringing the frame in registration with the front face of the speaker box and inserting the engaging projections of the front frame into the retaining holes formed on the front face of the speaker box.

The present invention has been shown and described with reference to specific embodiments. However, it should be understood that the invention is in no way limited to the details of the illustrated structures but changes and modification may be made within the scope of the appended claims.

I claim:

1. A method of manufacturing a speaker box comprising the steps of preparing thermoplastic front frame having many protrusions formed on a substantially whole front face thereof and many thorn-like projections formed on a substantially whole rear face thereof; forcing said front frame onto a cloth with the front face of said front frame being directed to said cloth, so that said front protrusions cut into said cloth so as to temporarily secure said cloth to said front frame; rearwardly folding a peripheral portion of said cloth extending outside said front frame and further inwardly folding said peripheral portion to make said cloth pierced by said thorn-like projections on said rear face of said front frame; softening and depressing the head portions of said thorn-like projections piercing said cloth to cause each of the said projections on said rear face of said front frame to have a head larger than the mesh of said cloth so that said cloth is permanently secured to said front frame; and integrally engaging the cloth covered front frame so formed with the front face of a speaker box.

2. A method according to claim 1 wherein said integrally engaging step is performed by bringing said cloth covered front panel in registration with said front face of said speaker box and inserting rearwardly extending engaging projections of said front frame into retaining holes formed on said front face of said speaker box.

3. A method according to claim 1 or 2 wherein said softening and depressing step is performed by using a heated iron.

4. A cloth covered front panel for use in a speaker box comprising a front frame having many protrusions formed on a substantially whole front face thereof and a cloth covering said front face of said front frame and secured to said front frame by forcing said front frame onto said cloth with said front face of said front frame being directed to said cloth so that said front protrusions cut into said cloth so as to temporarily secure said cloth to the front frame; rearwardly folding a peripheral portion of said cloth extending outside said front frame and further inwardly folding said peripheral portion to cause said peripheral portion to be pierced by thorn-like projections formed on a substantially whole rear face of said front frame; and softening and depressing the head portions of said thorn-like projections to cause the projections on said rear face of said front frame to have a head larger than the mesh of said cloth so as to permanently secure said cloth to said front frame.

* * * * *

UNITED STATES PATENT AND TRADEMARK OFFICE
CERTIFICATE OF CORRECTION

PATENT NO. : 4,244,096
DATED : January 13, 1981
INVENTOR(S) : Kashichi HIROTA

It is certified that error appears in the above-identified patent and that said Letters Patent are hereby corrected as shown below:

In the heading

[75] Inventor: Applicant's name which reads Hirota Kashichi should read Kashichi HIROTA Signed and Sealed this Sixteenth Day of June 1981

[SEAL]

Attest:

RENE D. TEGTMEYER

Attesting Officer    Acting Commissioner of Patents and Trademarks